Dec. 27, 1966 E. C. DRIESE ETAL 3,295,103

SYSTEM FOR CLASSIFYING MINIMALLY CONSTRAINED STIMULI

Filed Aug. 16, 1962 5 Sheets-Sheet 1

EDWARD C. DRIESE
JOHN S. GERIG
MALCOLM R. UFFELMAN
RICHARD E. WILLIAMS
INVENTORS

BY Hurvitz and Rose
ATTORNEYS

SYSTEM FOR CLASSIFYING MINIMALLY CONSTRAINED STIMULI

Filed Aug. 16, 1962 5 Sheets-Sheet 2

EDWARD C. DRIESE
JOHN S. GERIG
MALCOLM R. UFFELMAN
RICHARD E. WILLIAMS
INVENTORS

BY Hurvitz & Rose

ATTORNEYS

SYSTEM FOR CLASSIFYING MINIMALLY CONSTRAINED STIMULI

Filed Aug. 16, 1962 5 Sheets-Sheet 3

EDWARD C. DRIESE
JOHN S. GERIG
MALCOLM R. UFFELMAN
RICHARD E. WILLIAMS
INVENTORS

BY Hurvitz and Rose
ATTORNEYS

SYSTEM FOR CLASSIFYING MINIMALLY CONSTRAINED STIMULI

Filed Aug. 16, 1962 5 Sheets-Sheet 4

EDWARD C. DRIESE
JOHN S. GERIG
MALCOLM R. UFFELMAN
RICHARD E. WILLIAMS
INVENTORS

BY Hurvitz and Rose
ATTORNEYS

INVENTORS
EDWARD C. DRIESE, JOHN S. GERIG,
MALCOLM R. UFFELMAN
& RICHARD E. WILLIAMS
BY Hurvitz and Rose
ATTORNEYS United States Patent Office 3,295,103
Patented Dec. 27, 1966

3,295,103
SYSTEM FOR CLASSIFYING MINIMALLY CONSTRAINED STIMULI

Edward C. Driese, Falls Church, John S. Gerig, McLean, Malcolm R. Uffelman, Falls Church, and Richard E. Williams, Fairfax, Va., assignors to Scope, Incorporated, Falls Church, Va., a corporation of New Hampshire Filed Aug. 16, 1962, Ser. No. 217,350
17 Claims. (Cl. 340—146.3)

The present application is a continuation-in-part of our co-pending application, Ser. No. 147,883, entitled "Statistical Classification of Stimuli," filed October 26, 1961, now abandoned.

The present invention relates to pattern recognition systems wherein arbitrary classification functions are realized by means of conditioning (teaching) routines. This conditioning process employs patterns (stimuli) that are typical of those to be classified by the system. The stimuli may take such forms as visual, acoustical, pressure, or temperature fields, and are constrained only by the finite resolution of the system's sensory input.

The present invention employs, in one embodiment, a parallel recognition system, and in another embodiment, a sequentially operated digital system. In the parallel system, a multiplicity of sensory elements are included in a sensory or S field. The sensory elements are randomly connected to a discriminatory field which includes a plurality of discriminatory or D cells.

A plurality of memory fields, one field for each of the separate classes to be learned or recognized, are provided. In each of the memory fields a plurality of memory or M cells are provided, on a one to one basis with each of the discriminatory cells. In testing the system's ability to classify, each D cell feeds a multiplicity of M cells (one in each memory field) each having a value stored therein which is related to the successive D cell outputs corresponding to the set of stimuli employed in the conditioning routine. By employing plural M cells for each D cell, the number of recognition elements is considerably decreased over a prior system which employs one recognition cell for each memory cell.

The memory cell outputs are multiplied with the instantaneous outputs of the D cells for the stimulus under observation. These products are summed together to obtain the cross-correlation of each of the memory fields with the stimulus applied to the system. The several cross-correlation functions are compared and the largest is indicated. This provides an indication of the match between the stimulus to which the system was subjected and the memory which it best fitted.

Each of the D cells is capable of producing three outputs, depending upon the value of the inputs applied to it. Each D cell algebraically adds the S field outputs which are fed to it to derive an output of zero, +1, or −1, The D cell output varies on a random basis depending upon the activation of the sensory cells in response to the stimulus and the connections between it and the S field cells. By employing a D cell having three outputs rather than two, the system can be made to correctly classifiy stimuli regardless of their relative coverage on the sensory field.

When the system is utilized in a sequential rather than a parallel manner, only a single D cell is utilized. The D cell output is combined in an accumulator in a sequential manner with sequentially generated storage outputs. The storage outputs are sequentially added or subtracted together in response to a sign comparison between each D cell output and the corresponding stored value when the system is being conditioned.

As in the case of the parallel system, plural memories are provided, one for each of the functions to be recognized. One accumulator is provided for each of the memories to derive a cross correlation function between the input and stored signals. In one embodiment, the stored amplitudes are fed to the accumulator while in another embodiment the accumulator adds polarity similarities and subtracts polarity dissimilarities between the input and stored signals. The accumulator outputs are compared at the end of a complete scanning cycle to determine which of the cross correlation functions is greatest. The highest amplitude function provides an indication of the best fit between the stored signals and stimulus being sensed.

To provide connections between the sensory field and the D cell inputs in a digital system, a matrix of sensory cells is provided. The sensory cells are activated by a pair of feedback shift registers which are advantageous since they provide a relatively long repeatable pseudo-random binary sequence with minimum hardware. By providing plural feedback shift registers, each having N actual stages a cycle $2^N-1$ bits long is generated. A pseudo-random sequence is one whose statistical properties closely approximate those of a completely random sequence, being a part of a longer sequence which is cyclic or periodic in feature. Such pseudo-random sequences and the means for generating the same are disclosed, for example, in Peterson, Error Correcting Codes (Wiley, 1961). Maximal length sequence generators and examples of shift register-implemented generators which may be employed to produce the pseudo-random sequences are described in chapter 8 of the Peterson text under the heading "Cyclic Codes."

Simultaneous energization of an intersection with binary ones from each of the shift registers results in possible energization of the sensory cell and application of its output to the D cell. One half of the sensory cells generate positive voltages while the other half generate negative voltages in response to activation of their respective intersection by the shift registers. The outputs of all of the sensory cells in the sensory field become the inputs to a single D cell in the sequentially operated digital system. The sequential system has the advantage over the parallel operated system in that only a single D cell is necessary. While the use of a single D cell is desirable in many instances where hardware is designed to be minimized, the parallel system is highly desirable because of its high speed and because reliability is great in that component malfunctions do not result in complete system failure.

It is accordingly an object of the present invention to provide a new and improved system for classifying minimally constrained stimuli. The terminology minimally constrained stimuli refers to patterns which are constrained only in that they are taken from the set of definable patterns which can be applied to a sensory field. That is, no restrictions or constraints are imposed on the patterns that can be employed or used, or the manner of grouping the patterns, except that all patterns be defined on the sensory field.

It is another object of the present invention to provide a system for minimizing the hardware necessary in a minimally constrained system by providing one decision field for a multiplicity of memory fields.

It is yet another object of the present invention to provide a new and improved system for classifying minimally constrained stimuli wherein plural memory fields for storing different sets of stimuli derived functions are provided and a single discriminatory element feeds in parallel an associated memory cell of each of the memory fields.

It is still another object of the present invention to provide a system for classifying minimally constrained stimuli wherein a single discriminatory cell is sequentially responsive to the same stimulus for a complete cycle of random stimulus activation.

It is still a further object of the present invention to provide a system for classifying minimally constrained stimuli, which system employs a discriminatory cell having three discrete outputs in response to the inputs thereto from the stimuli.

A further object of the present invention is to provide a system for classifying minimally constrained stimuli which effects a cross correlation between a plurality of stored sets of stimuli derived functions and the stimulus being subjected to the system to ascertain the best fit between the stored values and the input.

Another object of the present invention is to provide a system for randomly energizing a plurality of sensory elements by the use of feedback shift register generators (*m*-sequence generators).

The above and still further objects, features and advantages of the present invention will become apparent upon consideration of the following detailed description of one specific embodiment thereof, especially when taken in conjunction with the accompanying drawings, wherein.

Figure 1:
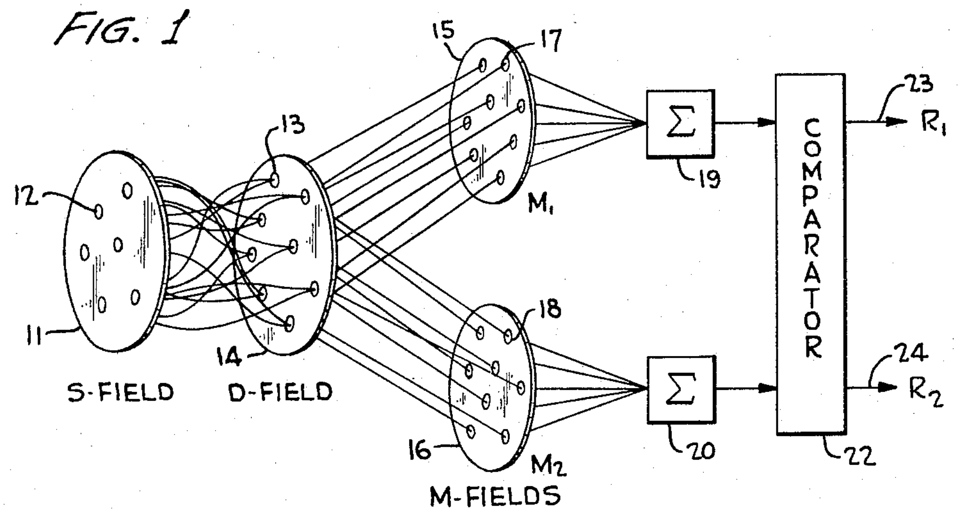
FIGURE 1 is a block diagram of a simplified form of the present invention.

Reference is now made to FIGURE 1 of the drawings which discloses a sensory or S field 11 including six transducers 12 for converting environmental stimuli into electrical signals. The transducers 12 may, for example, take the form of photoelectric resistors, pressure responsive transducers, temperature responsive resistors or a microphone with associated frequency filters and amplitude detectors. The signals generated by each of the transducers 12 in S field 11, which may be analog or digital, are applied in an arbitrary or random manner to eight decision elements 13 in discriminatory or D field 14. The connections between the transducers 12 and the decision elements 13 is prewired on a completely arbitrary basis if no prior knowledge is available. In the present patent disclosure, the definition of "random" has this connotation.

The number of possible combinations between the S field and each D cell is $$\frac{N_s!}{N_i!\ (N_s-N_i)!}$$

where $N_s$ is the number of sensory cells 12 and $N_i$ is the number of inputs to each decision element 13. For the simple case illustrated in FIGURE 1 where $N_s$ equals 6 and $N_i$ equals 2, the possible number of connections for each of the decision cell inputs 13 is fifteen. Since each group of connections between the sensory cells and each of the discriminatory cells 13 is randomly selected, the best way to select $N_d$ of them, where $N_d$ is the number of discriminatory cells 13, is by a random draw without replacement. If the exact characteristics of each stimulus or type of input to be applied to the system are known prior to the construction of the equipment, a better approach to the selection of D cell inputs probably exists. However, if no prior knowledge exists, the random selection of D cell inputs yields the best overall system performance.

In response to the random connections between the sensory field 11 and the discriminatory field 14, each of the D cells 13 algebraically adds the inputs applied thereto and generates an output signal having one of three values. If the sum of the inputs to the individual cell 13 is positive, a positive one is generated, a zero is generated if the input to the D cell is zero or lies in a narrow range between fixed limits, while a negative one is generated when the input is a negative amplitude greater than the defined limit. By utilizing a system having three separate and distinct outputs, the present system can be implemented with simple hardware while maintaining high classification accuracy for stimuli having great differences in size on the S field.

A pair of M or memory fields 15 and 16 include memory or M cells 17 and 18, respectively responsive to the output of each D cell 13. The number of M cells in each of the M fields 15 and 16 is equal to the number of D cells so that a one to one relationship between the M cells in each memory field and the D cells exists. The values stored in the memory cells 17 of memory field 15 are determined in accordance with the corresponding D cell responses to the first set of patterns or input function for which the system is adapted. The M cells of memory field 16 have stored therein D cell outputs corresponding with a second function learned by the system. If it is assumed that the system is responsive to photocell inputs which sense print in the English alphabet, 26 different M fields are provided, one for each of the 26 letters of the alphabet. If it is assumed that field 15 has stored the function for the letter A, its eight memory cells 17 have characteristics corresponding with the output of the D cells for the letter A. In a similar manner the M cells 18 of memory field 16 correspond with the letter B and so on for the remaining 24 letters of the alphabet.

The values stored in each of the M cells are multiplied by plus or minus one or zero depending upon the similarity between their stored polarity and the polarity and magnitude of their respective D cell outputs. If a particular M cell 17 has stored therein the amplitude X and a polarity of positive and a +1 input is applied thereto, the output of that particular M cell is +X. If the polarity of the signal stored in the M cell is different than that received from the D cell, the M cell output is negative. A zero is derived from the M cell if it stores or has an input of zero.

The outputs from the M cells 17 and 18 of memory fields 15 and 16 are algebraically summed by adders 19 and 20, respectively. Adders 19 and 20 derive output signals proportional to the amplitude of the signals applied thereto. The output of each of the summers is represented by $$r_i=\sum_{j=1}^{N_d} G_{ij}D_j$$

where $r_i$ is the output of the $i^{th}$ summing element, $G_{ij}$ is the stored value in the $i^{th}$ M field of the $j^{th}$ M cell, and $D_j$ is the output of the $j^{th}$ D cell. From this expression it will be noted that each of the $r_i$ outputs represents the cross-correlation of each stored memory function and the output of the D field. The maximum amplitude cross-correlation is an indication of best fit between the corresponding M field function and the D field output.

To determine which of the cross-correlations is of greatest value and hence representative of the best fit, the outputs of summers 19 and 20 are applied to comparator 22. Comparator 22 compares the amplitude of the inputs applied thereto from the summers 19 and 20 and produces an output on one of the leads 23 or 24 indicative of which cross correlations is maximum. By observing which of the leads 23 or 24 has a signal on it by means of a light indicator or such, an indication is provided as to the function or stimulus sensed by the S field 11.

To teach the M fields 15 and 16 the required information initially, only one of them is rendered responsive to the D field 14 outputs. The stimulus to be learned by the particular M field, for example M field 15, is detected by the transducers 12 in the S field and causes various outputs to be derived from the decision elements 13 within D field 14. The decision element outputs are fed to the memory cells 17 which store their value for latter comparison with input stimuli to be analyzed.

Since the present system is designed to detect similarities between input stimuli which are not exactly similar, variations of the same input stimuli are applied to the S field while the system is in a learning state so that each M field is subjected to different outputs of the D field for the same stimulus class. It it is assumed that the present device is to be utilized as a system for reading various types of printing, each of the expected type fonts is applied to the input of the S field.

If it is expected that two different print fonts are to be applied to the system, and that memory field 15 is to store the letter A, the first A is applied to the S field 11 causing a set of outputs from the D field 14, which set is applied to the memory cells 15. The second type of A to be read by the system is then applied to the S field causing a variation in the output of the D field. This variation in the output of the D field causes a change in the amplitude of the signal stored in M cells 17. The system is now sequentially subjected to the different types of B in the print font to be read. The M field 16 is connected to the D field 14 while M field 15 is rendered unresponsive to the D field output. After each of the M fields has been preloaded, the system is ready to read subsequent inputs applied to it. This is accomplished in the manner described supra.

Variations between the input signals to the system which were preselected and the actual signal detected are possible. In designing the present system the number of D cells, $N_d = 2\Gamma^2 N_e$; where $N_e$ is the number of different stimuli for each function used during the learning phase, thus $N_e$ in the previously described example where two different print fonts were utilized is 2; Γ, the signal to noise ratio =

$$\frac{(\text{mean of correct } \Gamma_i) - (\text{mean of incorrect } \Gamma_i)}{(\text{variance of correct } \Gamma_i) + (\text{variance of incorrect } \Gamma_i)}$$

The probability of correctly identifying a stimulus may be shown to approximately equal $$P_c = \frac{1}{\sqrt{2\pi}} \int_{-\infty}^{\Gamma} \epsilon - \frac{X^2}{2} dx$$

It can be shown that for values of Γ in excess of three that $P_c$ exceeds 0.9987 so that such values of Γ result in an almost 100% probability of correct identification of input stimuli.

Figure 2:
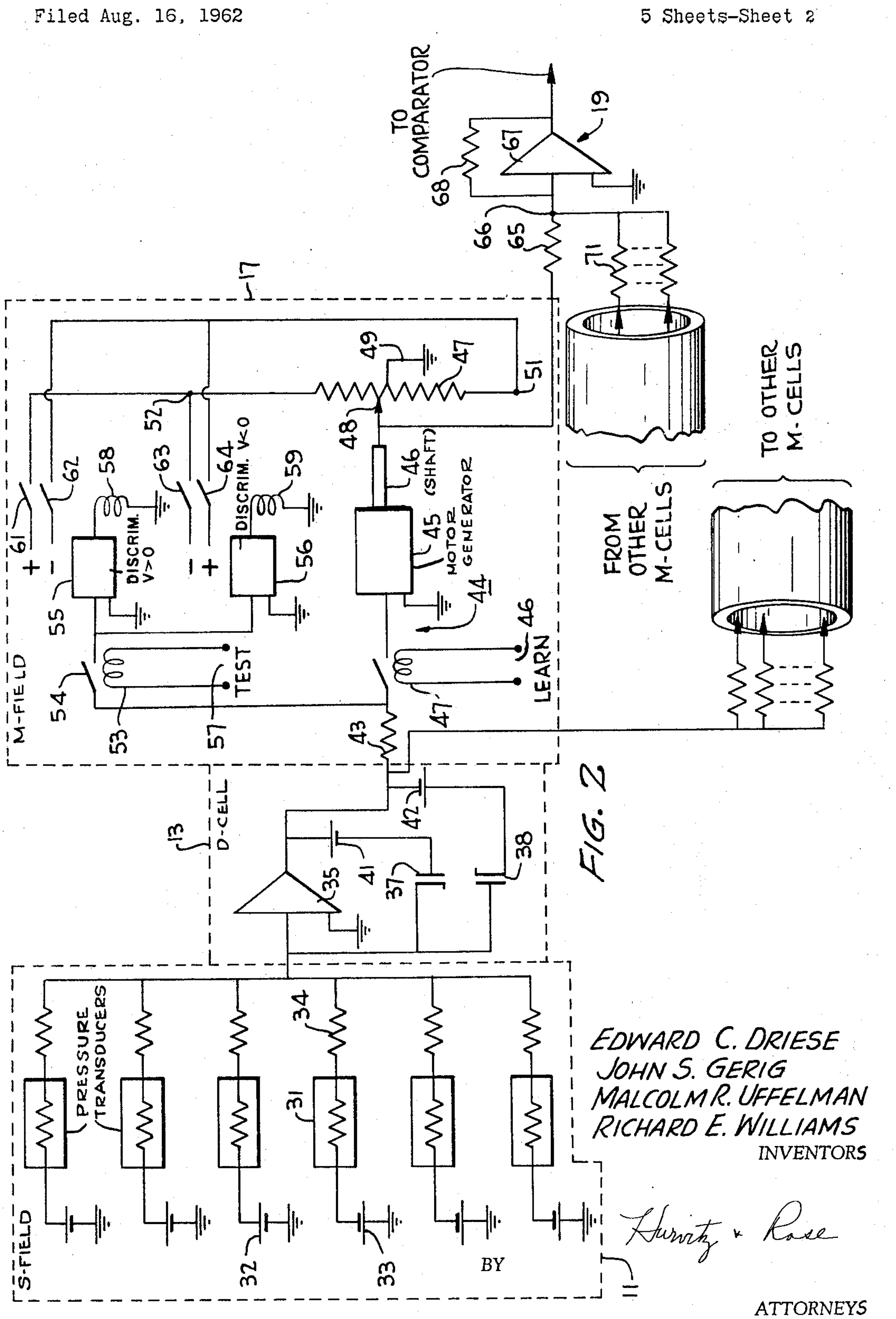
FIGURE 2 is a circuit diagram of the manner in which the system of FIGURE 1 is constructed as an analog system.

Reference is now made to FIGURE 2 of the drawings which discloses one preferred embodiment of the present invention utilized as a parallel, analog system. The S field 11 comprises a multiplicity of pressure responsive transducers 31, half of which are connected to positive power supplies 32 and the other half of which are connected to negative power supplies 33. The outputs of six of the pressure transducers 31 are supplied through summing resistors 34 to the input node of operational amplifier 35, included in one of the D cells 13. In a completely unenergized system, the input impedances to the positive and negative sources are equal so that the net input and output of amplifier 35 is zero.

Operational amplifier 35 is of conventional type having an exceedingly large forward gain but includes two feed back loops for effecting outputs of only three values. The first feedback loop includes diode 37 having its cathode connected to the amplifier input node and its anode to the negative terminal of battery 41, the positive terminal of which is connected to the amplifier output. The other feedback loop includes diode 38 and battery 42 which are series connected between the amplifier input and output with the opposite polarity of the first feedback loop. The operation of this circuit is well known and is such that the amplifier output is a negative value, equal to the voltage of supply 42, when the input to amplifier 35 is positive. When the input to amplifier 35 is negative, the circuit output is a positive voltage equal in amplitude to the potential of battery 41. For zero value and very low level inputs to amplifier 35, the circuit output is zero.

The output of D cell 13 is supplied in parallel to M field 17 via isolating resistor 43 and to a plurality of other M fields, not shown. The output of D cell 13 is applied via the contacts of relay 44 to the input of motor generator feedback circuit 45 when the system is in a "learn" state. When the system is in this state, a voltage is applied to learn input terminals 46 of memory cell 17 to energize coil 47 and close the contacts of relay 44. Motor generator set 45 is of the standard type which includes a negative feedback loop comprising a tachometer generator driven by the motor shaft. Thus, the shaft 46 of the motor generator set 45 is set at a position commensurate with the integral of the D cell output.

Potentiometer 47 has its center tap 49 grounded and its opposite ends 51 and 52 connectible to positive or negative voltages depending upon the system input during a test cycle. The potentiometer slider 48 is maintained at the center tap 49 of potentiometer 47, i.e. at ground potential, prior to the conditioning operation. If the input to D cell 13 is positive, slider 48 is driven between contact 52 and tap 49 while it is driven in the opposite direction when the net input to D cell 13 is negative.

During a test cycle, when it is desired to ascertain the best fit between the input and stored signals, relay 44 is de-energized and relay 53 is activated. Relay 53 includes a pair of contacts 54 which connect the D cell output to the inputs of a pair of discriminators 55 and 56 when an energizing voltage is applied to the input terminals 57 or relay 53. Discriminator 55 energizes relay coil 58, connected to its output, when the voltage applied to it is greater than zero while relay coil 59 is energized by the output of discriminator 56 when the voltage applied to relay contacts 54 is less than zero. If the input voltage to the memory cell 17 from D cell 13 is zero, neither discriminator 55 nor discriminator 56 is activated.

Activation of coil 58 causes contacts 61 and 62 to close, thereby applying positive and negative voltages to the terminals 52 and 51, respectively, of potentiometer 47. Activation of relay coil 59 causes contacts 63 and 64 to be closed with the opposite voltages being applied to terminals 51 and 52. Thus potentiometer 47 in combination with the voltages applied thereto by closure of relay contacts 61–64 results in a multiplication of the stored value of the M cell by +1, −1, or zero. If the stored value of the function analyzed, as indicated by the position of the shaft 46 and slider 48 is of the same polarity as the D cell output, a positive voltage is obtained at the slider 48. If a dissimilarity in polarity between the stored value and the D cell output occurs, a negative output voltage is obtained at slider 48. If the stored value or the actual function input is zero, a zero voltage is derived from slider 48.

The output of M cell 17 is applied through summing resistor 65 to the input node 66 of operational amplifier 67. Operational amplifier 67, with its input and feedback resistors 65 and 68, comprises the summing unit 19 of FIGURE 1. Operational amplifier 67 is responsive to a plurality of other M cell outputs (not shown), which are supplied to it via summing resistors 71. In a complete system, the inputs in the sensory field 11 are applied to a multiplicity of D cell summing amplifiers and the D cell outputs are applied in parallel to many memory fields, one memory field being provided for each function learned.

The output of operational amplifier 67 is applied to a conventional analog comparator as are the outputs of similar summing amplifiers. The comparator determines which of the amplifier outputs is maximum to generate an indication of the best fit between the input stimulus and the stored functions.

Figure 3:
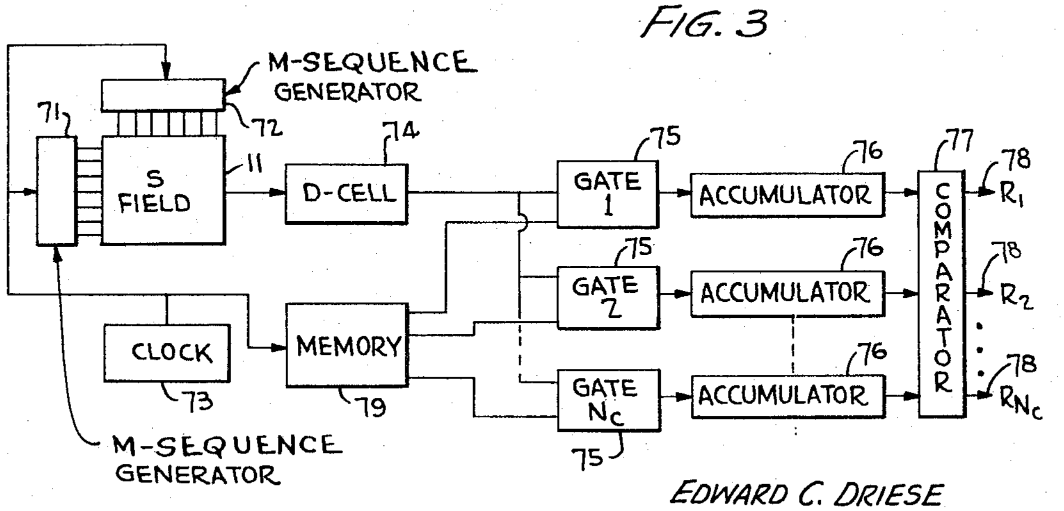
FIGURE 3 is a block diagram of a digital system.

Reference is now made to FIGURE 3 of the drawings which discloses the manner in which the present invention may be utilized as a sequentially operated digital device adapted to recognize a plurality of different inputs. The system of FIGURE 3 includes an S field 11 having a plurality of transducers which are activated in a pseudo random manner by the maximal length sequence generators (M-sequence generators) 71 and 72. M-sequence generators 71 and 72 are feedback shift registers of a well-known type which are responsive to clock pulse source 73. Generators 71 and 72 include any number of output stages, the output stages being interconnected in a matrix which includes the sensory field 11. At each intersection of the outputs from generators 71 and 72, a transducer in field 11 is located. When voltages are applied to a particular intersection from both generators 71 and 72, the transducer at the intersection is activated. This results in a signal being derived and applied to D cell 74 indicative of the stimulus.

The polarity of the sum of the inputs to D cell 74 will be positive, zero or negative depending upon which of the intersections in the S field 11 are energized by generators 71 and 72 and the external stimulus. In this respect it will be observed that while a single line is shown proceeding from the sensory field to the D cell, this single line is meant to represent multiple lines by which all sensory cells are capable of supplying inputs to the D cell. Only those sensors appearing in the matrix at intersections which are subjected to energizing voltages by both generators 71 and 72 will, of course, be activated at any given instant. The S field outputs are algebraically sumed upon application to D cell 74 which derives an output having one of three values, +1, 0, or −1, depending upon the relative amplitude of its input. The +1, 0 and −1 outputs of D cell 74 are derived in response to the net application of a positive, zero, or negative voltage to the D cell input. The D cell sequentially derives this ternary signal in response to the sequential energization of S field 11 by the M-sequence generators 71 and 72. The actual construction of M-sequence generators 71 and 72 and their interconnections with S field 11 are described infra, FIGURE 4.

When the system is in a test condition, the output of D cell 74 is applied in parallel to polarity coincidence or product gates 75. The output of each product gate 75, $N_c$ product gates being provided (where $N_c$ is the number of classes (sets) to be defined by the system), is applied to a separate accumulator 76. Accumulators 76 are standard reversible counters so that they count in both the positive and negative directions. The outputs of accumulators 76 are applied to a comparator 77 which determines which accumulator has the largest value stored therein subsequent to a complete scan of the stimulus being analyzed. The comparator 77 then generates an output pulse on the lead 78 which corresponds with the maximum accumulator value.

Product gates 75, in addition to being responsive to the D cell output are responsive to memory 79 which is driven by clock 73 so that the memory output is in synchronism with the output of the sequence generators 71 and 72. Memory 79 which may take the form of any suitable type memory, e.g., tape, disc, drum, core, has values stored therein indicative of the D cell amplitude and polarity outputs for each of the functions to be recognized.

The memory 79 may be initially preprogrammed by the D cell output. This is accomplished by an operator inserting a predetermined stimulus on the S field 11 and then activating clock 73 so that the S field is scanned by generators 71 and 72 for a complete sequence. The corresponding D cell outputs are stored in memory 79 for the complete sequence of the particular stimulus being analyzed. The next stimulus is then inserted in S field 11 and the memory is set to record the D cell output thereof.

Figure 7:
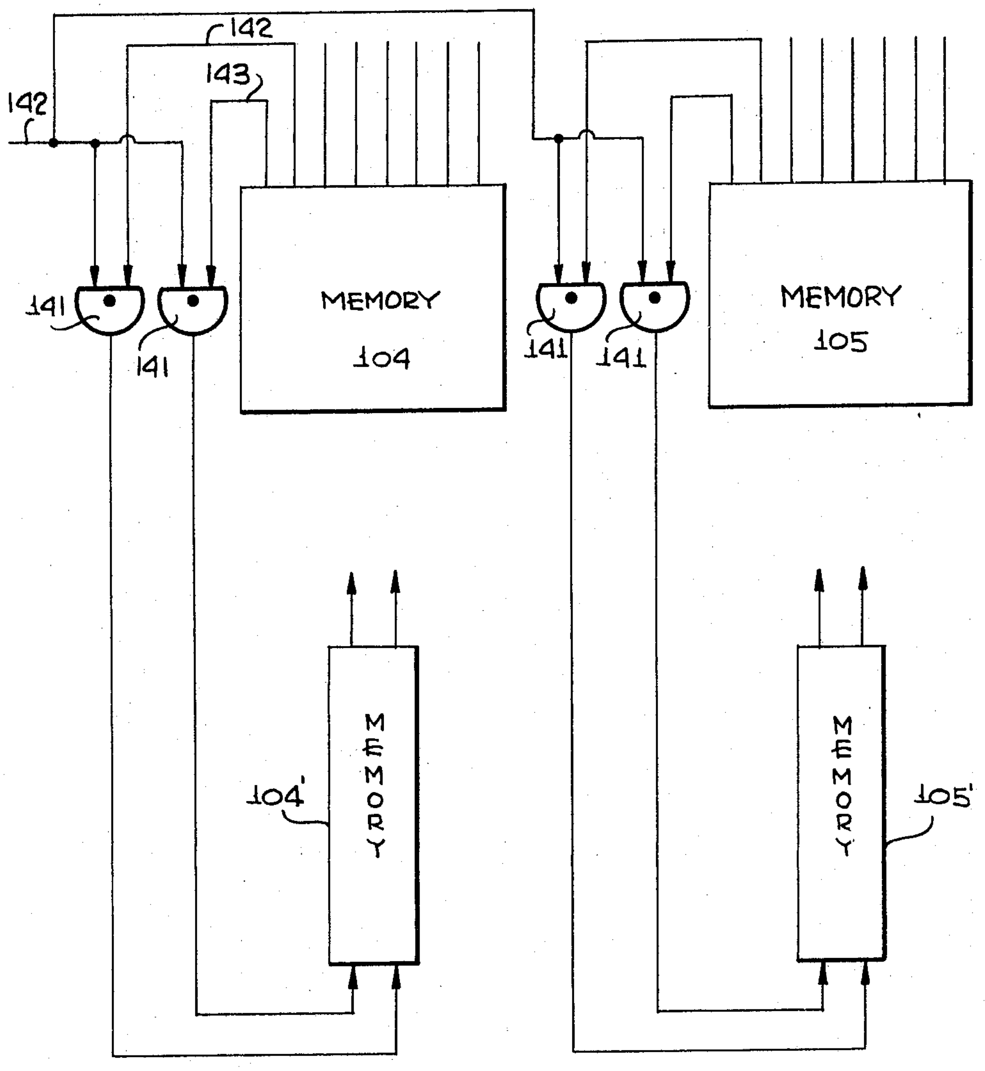
FIGURE 7 is a circuit diagram illustrating the connections between a permanent and temporary storage according to an embodiment of the invention.

The signal stored in memory 79 for each stimulus may be either a multi-bit binary representation of the actual accumulated numerical values of the D cell outputs or a single bit binary indication of the polarity of the accumulated D-cell numerical values. The manner in which the two different types of representations is read into the memories is treated infra, in connection with FIGURES 5 and 7. The type of memory selected depends on desired accuracy, and reliability, as well as cost and space requirements.

During playback, when analyzation of the S field is being made, the first, second and $N_c$ memory outputs are applied in parallel to the respective gates 75 in response to clock 73. Thereby, a comparison is made in gate 75 of the stored functions in memory 79 with the D cell 74 output. If it is assumed that memory 79 stores only polarity information, each of the gates 75 multiplies its two inputs and derives an output having a value of +1 when the memory output coincides in polarity with the D cell output, −1 when the memory output is opposite in polarity to the D cell output, and 0 when either the D cell or memory output is zero. To accomplish this, gate 75 may take the form of an inverted half adder with inhibit provision when a zero is applied to it by either D cell 74 or memory 79. Since the accumulators 76 add or subtract the amplitude values of memory 79 in accordance with the outputs of gates 75, their outputs may be considered as a cross-correlation function of the memory 79 output with the D cell 74 output. The cross-correlation having the maximum value is a measure of the best fit between the stored memory track and the stimulus being analyzed.

Figure 4:
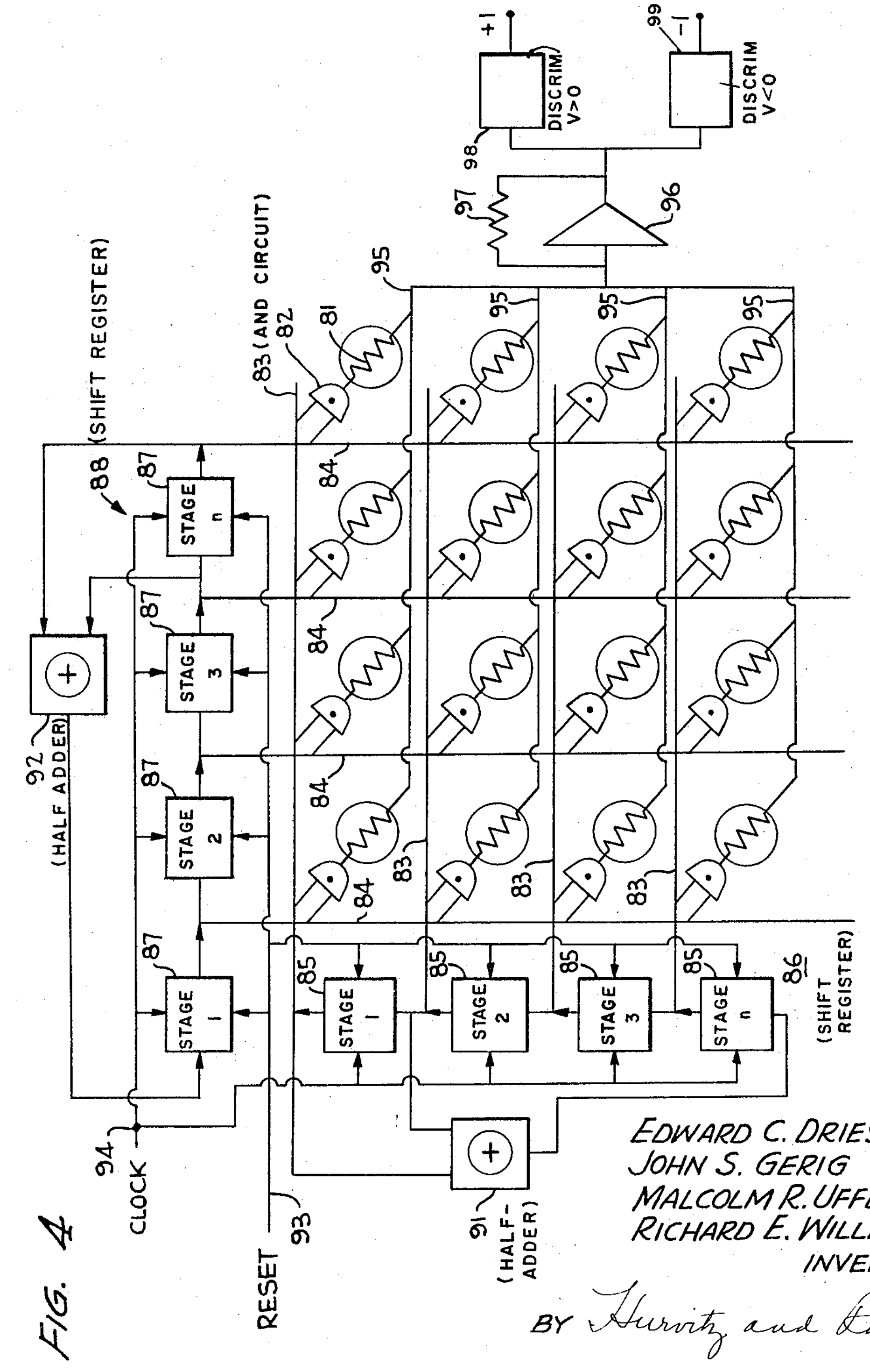
FIGURE 4 is a circuit diagram of the *m*-sequence generator, the sensory field and the decision cell utilized in the digital embodiment of the present invention.

Reference is now made to FIGURE 4 of the drawings which discloses one preferred embodiment for the S field 11 and the *m*-sequence generators. The system of FIGURE 4 includes an even number (16) of photoresistors 81. Each photoresistor 81 is connected in the output circuit of an AND circuit 82. One-half of the AND circuits 82 are designed to generate positive voltages when both inputs thereto are activated while the other half are designed to generate negative voltages when both inputs are activated. One input of each AND circuit 82 is derived from one of the horizontal leads 83 while the other input is derived from one of the vertical leads 84. Each of the leads 83 is connected to a separate output stage 85 of shift register 86 and each of the leads 84 is responsive to one of the shift register stages 87 of shift register 88.

Shift registers 86 and 88 are of the feedback type and include a binary half-adder or modulo two adder responsive to the last and another of the stages. The modulo two adders 91 and 92 have their outputs connected to the first stages of shift registers 86 and 88, respectively.

Initially, predetermined stages of shift registers 86 and 88 are preloaded with binary ones by signals applied on lead 93. When the desired stages of the shift register are loaded, the system is ready to be activated and clock pulses are applied in parallel to each of the stages by lead 94. Application of the clock pulses results in advancing the binary signals stored in the various shift register stages. Feedback shift registers are utilized because they generate a repeatable pseudo-random binary sequence of relatively long length with minimum hardware. With a shift register of N actual stages, the shift register generates a cycle $2^N-1$ bits long. Accordingly, with the present simplified system employing four actual shift register stages and a binary half adder, a sequence having a length of 15 bits is generated by utilizing only four shift register stages and a single binary half adder. Of course it is to be understood that at least one stage of each of shift registers 86 and 88 must be loaded with a binary one so that sequential energization of leads 83 and 84 is effected.

The outputs of photoresistors 81 which sense black and white conditions in alpha numeric systems of print type analyzation, etc. are applied to leads 95 in parallel. The leads 95 are connected to the input node of operational summing amplifier 96, having a feedback resistor 97. Operational amplifier 96 generates a positive, negative or zero output voltage depending upon the relative energization of photocells 81, and AND gate 82. The output of amplifier 96 is applied in parallel to a pair of discriminator circuits 98 and 99 which derive plus or minus one signals of predetermined voltage and polarity depending upon the relative amplitude of the output of amplifier 96. If the amplifier 96 output is positive, discriminator 98 generates a binary one while discriminator 99 generates a one if the amplifier 96 output is negative. If the output of amplifier 96 is zero neither discriminator 98 or 99 is energized. In the system of FIGURE 3, the positive and negative outputs of discriminators 98 and 99 are applied in parallel to product gates 75 where they are combined with the polarity outputs of memory 79. If the system is in a learning mode, the D cell outputs are applied to the memory inputs rather than the product gate 75.

Figure 5:
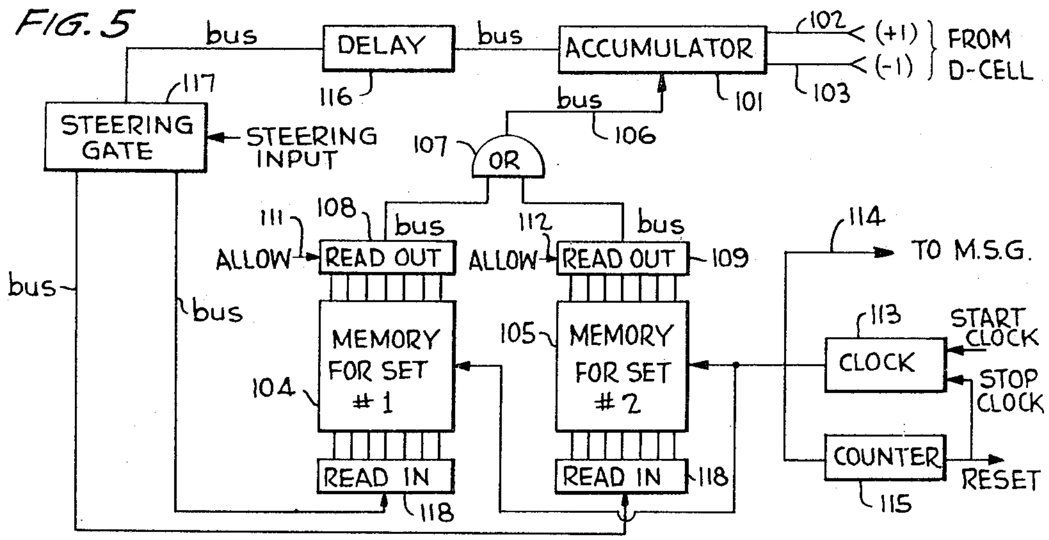
FIGURE 5 is a block diagram of the apparatus utilized in a digital system for learning functions.

Reference is now made to FIGURE 5 of the drawings which discloses the system when it is connected in the learning operation and employs a binary memory for storing indications of the numerical values of the D-cell outputs. This system is illustrated as a sequential digitally operated machine employing a memory for two discrete input functions. The learning apparatus includes a parallel accumulator 101 responsive to the D cell outputs on leads 102 and 103 and to the parallel output of the selected one of the memories 104 or 105. The parallel memory outputs are applied to the accumulator via a multilead bus 106 which is connected through OR gate 107 to read out apparatus 108 and 109 of memories 104 and 105, respectively.

Memories 104 and 105 initially have no information stored therein and are consequently set to a position of all binary zeros. Parallel bits for each word of the memory are derived from read out mechanism 108 or 109 depending upon which of the read out mechanisms is energized by the sources connected to leads 111 and 112, designated "allow." Memories 104 and 105 are stepped to their various positions or words by clock 113 which also feeds shift registers 86 and 88 of the *m*-sequence generators via lead 114.

Connected in a feedback circuit between the input and output of clock 113 is a counter 115 having a length necessary to count up to N′ the number of bits that are used in the sensory field sampling. Almost always $N' \ll 2^N-1$ where N is the number of stages in an *m*-sequence generator. When the counter 115 reaches a count equal to the number of sensory field samples, an output pulse is derived which terminates the generation of pulses by clock 113 and resets the stages of shift registers 86 and 88 to their initial loaded condition.

The output of clock 113 is applied in parallel to memories 104 and 105 to shift the bits in the words from position to position. In consequence, the number of memory cells in each of the memories 104 and 105 is equal to the number of clock pulses used in sampling each stimulus.

Memories 104 and 105 are of the recirculating type so that their outputs derived from readout mechanism 108 are reapplied to them via accumulator 101, delay 116 and steering gate 117. If lead 102 is activated when an output is being generated by readout mechanism 108, a binary one is added to the stored signal in the memory so that the signal applied to the selected memory via read in mechanism 118 is increased in value by one. The opposite conditions prevail when lead 103, indicative of a minus one output from D cell occurs. Because the stored value may be positive or negative, each word in memories 104 and 105 includes a polarity bit and the usual amplitude bits. Delay 106 is provided to insure the correct timing relationship between the vacated position in the memory for the data being read out and the reinsertion of the same modified data, the modification occurring due to the signal on lead 102 or 103. If neither lead 102 nor 103 is activated the memory is recirculated in a completely unaltered manner.

In the initial learning process, each expected stimulus to be assigned to a given class is subjected to the S field.

For purposes of description, it is assumed that the system is learning to read the letter A. In response to the first and second different types of A's, a D cell output of plus 1 for the particular position in the sequence of *m*-sequence generators 71 and 72 was obtained. Thus, the binary value 10 is stored in the corresponding position in memory 104, assuming memory 104 is learning the letter A. (Memory 105 is unactivated during the present learning process since it is presumed that it will learn the letter B which is not being applied to the machine at the present time.) If it is assumed that the next type of letter A results in another +1 output from D cell 74, the binary signal 10, stored in the above stated position of memory 103, is increased in magnitude to 11 by accumulator 101 and reapplied to the memory 104 via delay element 116 and steering gate 117. When the fourth type of A is being read into the system it is assumed that a −1 output is derived from D cell 74. This causes the binary value 11 stored in said position of memory 104 to be decreased to the value 10 by accumulator 101.

After the complete set of A's has been applied to the system, memory 104 has stored in it a plurality of parallel binary signals indicative in magnitude and polarity of the different cyclic position D cell outputs of the letters A in the set. Memory 104 is then deactivated and memory 105 activated to be responsive to all of the letters B in the set. This operation is continued successively for each of the various types of inputs in the system. In an English alphabet recognition system, 26 different memories are employed. Each memory has stored therein a plurality of parallel binary words corresponding with the values of the D cell outputs.

Figure 6:
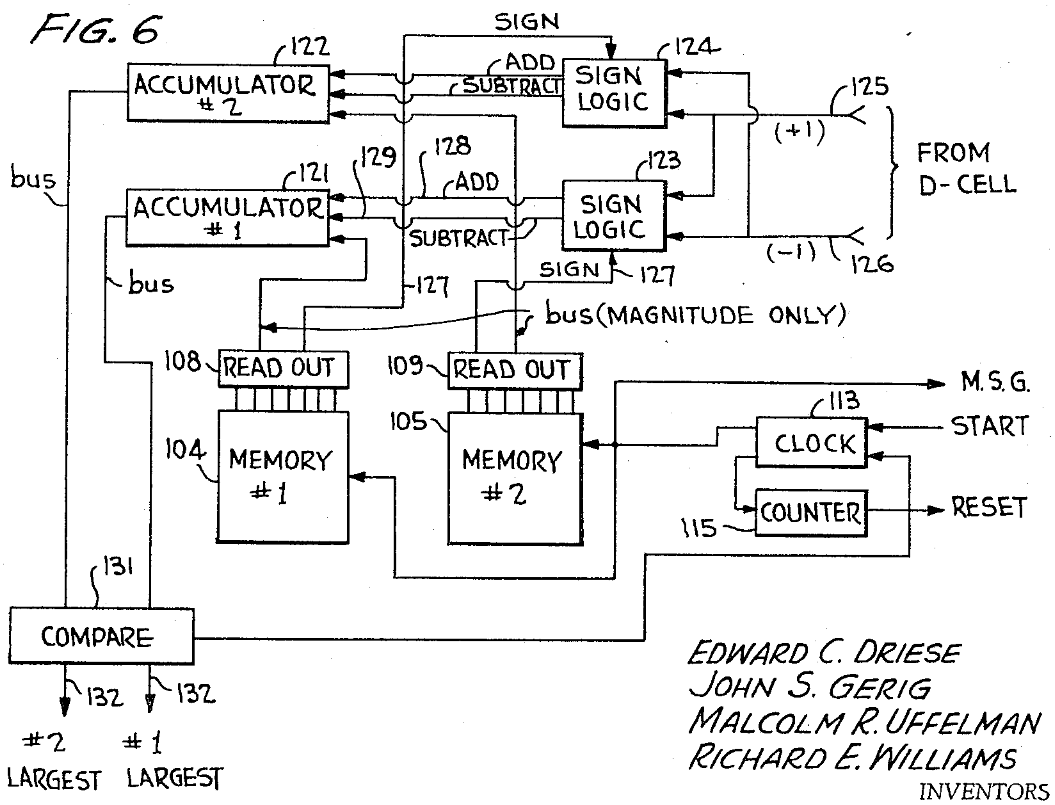
FIGURE 6 is a block diagram of the apparatus utilized for determining which of the learned or stored functions corresponds with the input stimulus to the system.

Reference is now made to FIGURE 6 of the drawings which discloses the connections of the system during a test or observation cycle once machine learning has been accomplished. The test apparatus includes the same memories 104 and 105 and their associated read out apparatus 108 and 109 as used in the learning operation of FIGURE 5. The memories are stepped through a complete cycle in response to clock 113 and counter 115 in substantially the same manner in which the memories are advanced during a learning process. Of course for a test run there are no inputs to the memories 104 and 105, the memories having been set at the proper stored values in response to the set of input stimuli.

The parallel outputs of memories 104 and 105 are sequentially applied to accumulators 121 and 122, respectively. Application of these parallel signals is under the control of sign logic gates 123 and 124. A sign logic gate is provided for each of the memories 104 and 105 in the system so that a comparison of the sign of the D cell output with the stored sign of the word for the particular point in the sequence generator cycle is obtained. Sign logic gates 123 and 124 are energized in parallel by the plus 1 and minus 1 outputs of D cell 74. Sign logic gates 123 and 124 may comprise inverted half adders with an auxiliary inhibit circuit so that when there is a signal on neither lead 125 nor 126 there is no output.

When the sign logic input on lead 125 corresponds with the sign memory output on leads 127, the add output lead 128 of the sign logic gate is activated. If a dissimilarity results in the polarity of the signals on leads 127 and the energization of the sign logic gates 123 and 124 from the D cell output, the subtract output 129 is energized. Energization of the add output lead 128 of sign logic gate 123 results in an increase in the value stored in accumulator 121 equal to the value stored in memory 104 at a time corresponding with energization of AND gates 82 by the sequence generator. Energization of subtract lead 129 results in a decrease in the value stored in accumulator 121 by the amount of the signal read out from memory 104. In a similar manner accumulator 122 stores values corresponding with the similarity and dissimilarity of the signs of the values stored in memory 105 with the D cell outputs.

Accumulators 121 and 122 each comprises a multi-stage parallel accumulator, which sequentially stores and adds the values of the signals applied thereto from memories 104 and 105 under the control of the add and subtract control signals from leads 128 and 129. Upon the completion of an *m*-sequence generator cycle, a reset pulse is derived from counter 115 and applied to comparison gate 131. At this time the outputs of accumulators 121 and 122 are sampled. The accumulator having the largest stored value causes energization of a corresponding one of the output leads 132 so that an indication of the best fit between the stimulus applied to the system and the stored values in memories 104 and 105 is obtained. This comparison technique yields the maximum cross-correlation function of the stored values with the actual input and is substantially the same as that utilized in FIGURE 1. The cross-correlation is on a sequential rather than on a parallel basis however.

A considerable reduction in the memory size without considerably lowering the accuracy of the system is achieved if each memory in FIGURE 6 stores only +1, 0, and −1 polarity values instead of amplitude values. This is accomplished by employing temporary storage mediums for memories 104 and 105, FIGURE 5. After the complete learning process is completed, the polarity bit in each word is transferred to the permanent two bit per word memories 104' and 105', FIGURE 7, by enabling AND gates 141 with a pulse on lead 142. Memories 104 and 104' are synchronously advanced so that the corresponding plus and minus polarities stored in memory 104 and derived on leads 142 and 143, respectively, are applied to memory 104'. Simultaneously, polarity information is transferred from memory 105 to memory 105' in the same manner. A zero output from memories 104 and 105 is stored as a blank in memories 104' and 105'. Of course it is to be realized that in an actual system, only a single temporary memory is utilized and is time shared between permanent memories 104' and 105'.

Memory space is further reduced by utilizing single bit per word storage for memories 104' and 105' and by coupling a single polarity signal from memories 104 and 105 to memories 104' and 105'. This is accomplished by coupling only the minus polarity bit in each word through AND gates 141. Thereby, a binary one is stored in memories 104' and 105' when the amplitude stored in memories 104 and 105 equals or is greater than zero while a binary zero is stored for negative values.

When utilizing only the polarity outputs of memories 104' and 105', the sequential outputs of sign logic gates 123 and 124, FIGURE 6, are added or substracted to control the amplitude stored in accumulators 121 and 122. When memories 104' and 105' have two bit per word storage, the sign logic gates function in exactly the same manner described supra in connection with FIGURE 6.

By utilizing a system wherein only polarity information is stored, the function Γ is reduced by $$\sqrt{\frac{2}{\pi}}$$

approximately 80%. For a demonstration and derivation of these reductions see Uffelman, "Conflex I," International IRE Convention Record, New York, March 1962, Volume 10, part IV. For the perfect case in which all stimuli to be tested have been subjected to the machine during learning, there is no reduction in recognition when a single bit per word memory is used over the two bit per word memory. However, if the system is subjected to stimuli other than those utilized during the learning operation, there is a greater probability of recognition with the two bit per word memory.

The use of polarity storage has the obvious advantage of decreased memory size with substantially the same accuracy as amplitude storage. However, it is not well suited to situations wherein it may be desired to add additional sets of stimuli after the initial learning process has been completed. This is because no information anent the actual values of the learned signals is retained. In consequence, the amplitudes of an added stimulus set predominate over the stored polarity values so that the memory has stored in it accurate information of only the added stimulus.

The sequential system of FIGURES 3–6 has advantages over the parallel system of FIGURES 1 and 2 because there is less apparatus and hardware required but the parallel system has the advantages of speed and reliability in that a single component malfunction will not result in a complete system failure.

While we have described and illustrated one specific embodiment of our invention, it will be clear that variations of the details of construction which are specifically illustrated and described may be resorted to without departing from the true spirit and scope of the invention as defined in the appended claims.

We claim:

1. A system for determining the greatest correlation between an input and a plurality of stored indications comprising a plurality of sensing means for detecting physical stimuli and for producing an input to said system representative thereof;

means responsive to input produced by said sensing means for randomly deriving a multiplicity of information signals related to the received input;

means for forming random operative connections between said means for deriving and said sensing means to effect the randomness of said derived information signal;

means responsive to said information signals and said stored indications for deriving a plurality of cross-correlation functions, one of said functions being derived for each of said stored indications; and means for indicating the cross-correlation function of maximum amplitude.

2. The system of claim 1 wherein each of said stored indications includes polarity segments and magnitude segments and said input signal includes only polarity information, said means for deriving including means for selectively adding and subtracting the magnitude segments in response to similarities and dissimilarities in the corresponding polarity segments and input signal polarities.

3. A system for sequentially deriving a signal indicative of a stimulus comprising an array of sensory elements responsive to said stimulus, said array being arranged in a matrix configuration having a plurality of columns and rows;

a plurality of generating means, each providing an output of pesudo-random binary sequences, means for applying the binary sequences from one of said generators to said rows of sensory elements, means for applying the binary sequences from another of said generators to said columns of sensory elements, and means associated with each of said sensory elements for activating said element in response to a predetermined relationship between the outputs of said plurality of generating means, whereby said elements of said array are randomly activated.

4. The system of claim 3 wherein an even number of said elements are provided, and means are provided for activating half of said elements with a signal of one polarity and for activating the other half of said elements with a signal of another polarity.

5. The system of claim 4 wherein each of said elements generates an information signal when activated, and means are provided for algebraically adding said information signals, to derive a sum signal.

6. The system of claim 5 including means for deriving a first indication of when said the sum signal is greater than a reference and a second indication of when said sum signal is less than said reference.

7. A system for classifying a plurality of minimally constrained stimuli comprising means responsive to a stimulus under observation, said means including a plurality of discrete sensing means, means operatively connected to said sensing means for randomly deriving a multiplicity of information signals corresponding to the stimulus under observation, and means forming a statistically random selection of connections between said sensing means and said means for randomly deriving to produce the randomness of the derivation of said information signals;

a discriminatory field responsive to said information signals, said discriminatory field deriving a plurality of signal bits, each bit being derived in response to the combined values of the random combination of said information signals;

a plurality of memory fields, each of said fields storing information bits indicative of the signal bits corresponding to each of said class of stimuli, means for combining the stored information bits of each memory field with said signal bits to derive a plurality of combined signals, and means for comparing said combined signals to determined the greatest correlation between said stimulus under observation and one of said classes of stimuli.

8. The system of claim 7 wherein said responsive means includes, an array of sensory cells arranged in an Nth order matrix, where N is any positive integer greater than zero, and said means operatively connected to said sensing means includes a plurality of feedback shift register means for generating a repeatable pseudo-random binary sequence, each of said shift register means having multiple outputs, and means for applying said outputs to said matrix for activating selected ones of said sensory cells.

9. The system of claim 7 wherein said discriminatory field includes means for deriving signal bits having one of only three values, and means for maintaining each of said information signals within predetermined limits.

10. The system of claim 7 wherein each of said signal bits is one of only three values, one of said values being of predetermined polarity relative to a second of said values, the other of said values being of the opposite polarity relative to said second value, wherein each of said memory fields includes means for storing a separate binary word indicative of the value of each of said combinations, each of said words including a first segment indicative of the polarity of the word relative to a reference and a second segment indicative of the amplitude of the word, means for deriving first and second control signals in response to each of said signal bits and each of said first segments, said first control signal being generated when the signal bit and the respective first segment are of like polarity, said second signal being generated when the signal bit and the respective first segment are different, an accumulator means for each of said memory fields responsive to a respective one of said second segments and to said first and second control signals, said accumulator means adding said second segment when said first control signal is generated and subtracting said second segment when said second control signal is generated.

11. The system of claim 7 wherein said means for combining includes; means for multiplying said stored information bits by said signal bits to derive a multiplicity of product bits for each memory field, and means for algebraically adding the product bits of each respective memory field, whereby a cross-correlation function is derived for each memory field.

12. The system of claim 11 wherein said means for comparing comprises means for determining the maximum amplitude cross correlation function.

13. The system of claim 11 wherein each of said means for multiplying includes; a potentiometer having a slider set at a position indicative of the respective stored information bits, and means for applying opposite polarity voltages to the ends of said potentiometer, and means for controlling the polarity of said voltages in response to the value of the respective signal bit.

14. A system for classifying a plurality of minimally constrained stimuli comprising means responsive to a stimulus under observation, said means including a plurality of discrete sensing means for randomly deriving a signal indicative of said stimulus, and means for effecting a random selection of said sensing means by which said signal is randomly derived, storage means for providing a separate store for each class of said stimuli, means for combining said randomly derived signal with the contents of each of said stores to derive a plurality of combined signals, and means for comparing said combined signals to determine the greatest correlation between said stimulus under observation and one of said classes of stimuli.

15. A system for classifying minimally constrained stimuli comprising means for storing a separate indication of each of said stimuli, each of said indications including a multiplicity of randomly derived signals indicative only of the polarity of combined portions of the respective stimulus, means randomly responsive to a stimulus under observation for deriving signals indicative of the polarity of the multiplicity of combined portions of said observed stimulus, means for subjecting said means for deriving to said random response, and means for determining which of said indications and said signals are most frequently similar in polarity.

16. The system of claim 15 wherein said indications and said signals achieve one of only three values.

17. The system of claim 15 wherein said indications achieve one of only two values.

(References on following page)

References Cited by the Examiner

UNITED STATES PATENTS

| | | | |
|---|---|---|---|
| 2,959,769 | 11/1960 | Greanias et al. | 340—146.3 |
| 2,978,675 | 4/1961 | Highleyman | 340—146.3 |
| 3,064,519 | 11/1962 | Shelton | 340—146.3 |
| 3,114,884 | 12/1963 | Jakowatz | 340—146.3 |
| 3,174,032 | 3/1965 | White | 340—146.3 |
| 3,191,149 | 6/1965 | Andrews | 340—146.3 |
| 3,192,505 | 6/1965 | Rosenblatt | 340—146.3 |
| 3,196,392 | 7/1965 | Horwitz et al. | 340—146.3 |
| 3,196,394 | 7/1965 | Horwitz et al. | 340—146.3 |
| 3,196,396 | 7/1965 | Reines et al. | 340—146.3 |
| 3,196,397 | 7/1965 | Goldstine et al. | 340—146.3 |
| 3,196,399 | 7/1965 | Kamentsky et al. | 340—146.3 |
| 3,222,638 | 12/1965 | Shelton | 340—146.3 |

OTHER REFERENCES

Bledsoe and Browning, 1959, Proc. of Eastern Joint Computer Conference, pp. 225–32, "Pattern Recognition and Reading by Machine."

MAYNARD R. WILBUR, *Primary Examiner.*

MALCOLM A. MORRISON, *Examiner.*

J. E. SMITH, D. W. COOK, *Assistant Examiner.*